United States Patent
Tokuda

[11] Patent Number: 5,614,989
[45] Date of Patent: Mar. 25, 1997

[54] LIGHT SOURCE FOR PHOTOGRAPHIC PRINTER

[75] Inventor: Kanji Tokuda, Kaisei-machi, Japan

[73] Assignee: Fuji Photo Film Co., Ltd., Kanagawa, Japan

[21] Appl. No.: 402,710

[22] Filed: Mar. 13, 1995

[30] Foreign Application Priority Data

Apr. 4, 1994 [JP] Japan .................................. 6-066049

[51] Int. Cl.$^6$ ........................ G03B 27/32; G03B 27/46; G03B 27/54; G03B 27/72
[52] U.S. Cl. .............................................. 355/67; 355/71
[58] Field of Search ................................ 355/1, 35, 67, 355/70, 71, 74; G03B 27/32, 27/46, 27/54, 27/72

[56] References Cited

U.S. PATENT DOCUMENTS

| | | | |
|---|---|---|---|
| 4,256,363 | 3/1981 | Briones | 350/3.86 |
| 4,936,642 | 6/1990 | Hung et al. | 350/3.81 |
| 4,949,389 | 8/1990 | Alleback et al. | 382/31 |
| 5,133,603 | 7/1992 | Suzuki et al. | 356/400 |
| 5,138,489 | 8/1992 | Paek | 359/561 |
| 5,365,354 | 11/1994 | Jannson et al. | 359/15 |

FOREIGN PATENT DOCUMENTS

| | | | |
|---|---|---|---|
| 60-114851 | 6/1985 | Japan | G03B 27/54 |

Primary Examiner—Arthur T. Grimley
Assistant Examiner—Herbert V. Kerner
Attorney, Agent, or Firm—Sughrue, Mion, Zinn, Macpeak & Seas

[57] ABSTRACT

A light source for a photographic printer which is designed so that almost all light energy emitted from a diffusing device can be utilized for printing, thereby markedly improving the light source efficiency. The light source is used in a photographic printer which illuminates a film (F) and projects an image of the film (F) onto photographic paper (P) to print the projected image on the paper (P). A diffuser (BD), which is disposed in an illuminating optical path in the vicinity of the film (F), is caused to perform reciprocative vibration in parallel to its own plane by a vibrating device (B), e.g., a voice coil, during the exposure time, so that, even if an image of dust or a blemish on the diffuser (BD) is formed on the print, the image becomes blurred on the photographic paper (P) because it moves during the exposure process, thereby preventing the print from being affected by the image of such an undesired object. Thus, it is possible to place the film (F) and the diffuser (BD) closer to each other than in the case of the conventional printer light sources. Consequently, the quantity of light that can be utilized for printing can be increased to a considerable extent.

5 Claims, 5 Drawing Sheets

LIGHT SOURCE FOR PHOTOGRAPHIC PRINTER

BACKGROUND OF THE INVENTION

The present invention relates to a light source for a photographic printer and, more particularly, to a printer light source which is designed so that the light source efficiency in a photographic printer is improved, thereby enabling the light intensity to be increased.

As shown in the perspective view of FIG. 5, a conventional photographic printer (hereinafter referred to simply as "printer") uses a diffuser D as a direct light source for illuminating a film F to be printed off, although the actual light source is a lamp S. Light from the lamp S is diffused by a diffusing box M and the diffuser D, thereby producing diffused light that is required as a printer light source. Thus, blemishes and dust which may be present on an image recorded on the film F are made inconspicuous, and unevenness of printing is eliminated. In addition, it is necessary to produce light which is directed in a direction different from the optical axis of printing light for purposes other than the printing purpose, i.e., measurement of light transmitted by the film F, transmission of light to a scanner, or visual observation. The diffuser D is also used for these purposes.

The present applicant has proposed various diffuser structures: a diffuser that anisotropically diffuses light in a direction perpendicular to the longitudinal direction of the film F (Japanese Patent Application Laid-Open (KOKAI) No. 01-298337); another diffuser that has minute steeple-shaped projections (Japanese Patent Application Laid-Open (KOKAI) No. 02-278243); and so forth.

Incidentally, if there is dust or a blemish on the surface of the diffuser D, the film F and the diffuser D must be spaced apart from each other by 10 mm or more so that the image of the dust or blemish will not be projected on the print. However, as the distance between the film F and the diffuser D increases, the quantity of light entering the printing lens L decreases, resulting in a reduction of the light source efficiency.

On the other hand, the distance between the film F and the diffuser D may be made shorter than 10 mm, provided that the depth of focus of the printing lens L is made satisfactorily shallow. If the distance is shortened in this way, however, a focusing failure is likely to occur because of minute curl of the film F. Therefore, it is impractical to shorten the distance between the film F and the diffuser D as described above.

Thus, in the conventional diffusion light sources for printers, a certain distance must be ensured between the film and the diffuser. Therefore, only a part of light energy emitted from the diffusing device can be used for printing, disadvantageously.

SUMMARY OF THE INVENTION

In view of the above-described problems of the conventional techniques, an object of the present invention is to provide a light source for a photographic printer, which is designed so that almost all light energy emitted from a diffusing device can be utilized for printing, thereby markedly improving the light source efficiency.

To attain the above-described object, the present invention provides a light source for a photographic printer which illuminates a film and projects an image of the film onto photographic paper to print the projected image on the paper. The light source has a diffuser which is disposed in an illuminating optical path in the vicinity of the film, and which is arranged to move during the time of exposure carried out to print the film image onto the photographic paper.

The diffuser may be arranged to rotate or move in a plane parallel to the plane thereof, or move in a direction intersecting the plane thereof.

In a case where the diffuser moves in a direction parallel to the plane thereof, the diffuser is preferably an anisotropic diffuser which is disposed so that the diffusion direction thereof is perpendicular to the longitudinal direction of the film, and which moves in the same direction as the diffusion direction, thereby making it possible to attain an improvement in the light source efficiency and also enabling printing that is independent of blemishes made on the film during transfer.

In the present invention, the light source has a diffuser which is disposed in an illuminating optical path in the vicinity of the film, and which is arranged to move during the time of exposure carried out to print the film image onto the photographic paper. Accordingly, it is possible to obtain a print which is free from the influence of dust and blemishes on the diffuser, and it is also possible to place the film and the diffuser closer to each other than in the case of the conventional printer light sources. Consequently, the quantity of light that can be utilized for printing can be increased to a considerable extent. Hitherto, the image of dust or blemishes on the diffuser has been made unsharp so as to be hidden by slightly defocusing the system, whereas, in the present invention, blur is deliberately introduced to prevent the image of dust or blemish from being formed on the print.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

As has been described above, a diffuser which is used in a conventional diffusion light source for a photographic printer (hereinafter referred to simply as "printer") must be spaced a certain distance apart from a film to be printed off to prevent the image of dust or a blemish on the surface of the diffuser from being recorded on the finished print and thus causing unevenness of printing. Accordingly, only a part of light energy emitted from the diffusing device can be used for printing. Theoretically, the present invention enables the distance between the film and the diffuser to be substantially eliminated.

That is, to prevent the print from being affected by dust or blemishes on the diffuser, the system should be arranged so that the image of such an undesired object will not be intensively projected onto a single point on photographic paper, although the conventional practice is to place the diffuser a certain distance away from the film. In the present invention, based on the above-described idea, the diffuser is caused to move, for example, in a direction parallel to the plane thereof during the time of exposure carried out to print the film image onto the photographic paper.

The printer light source according to the present invention will be described below in detail by way of embodiments and with reference to the accompanying drawings.

Figure 1:
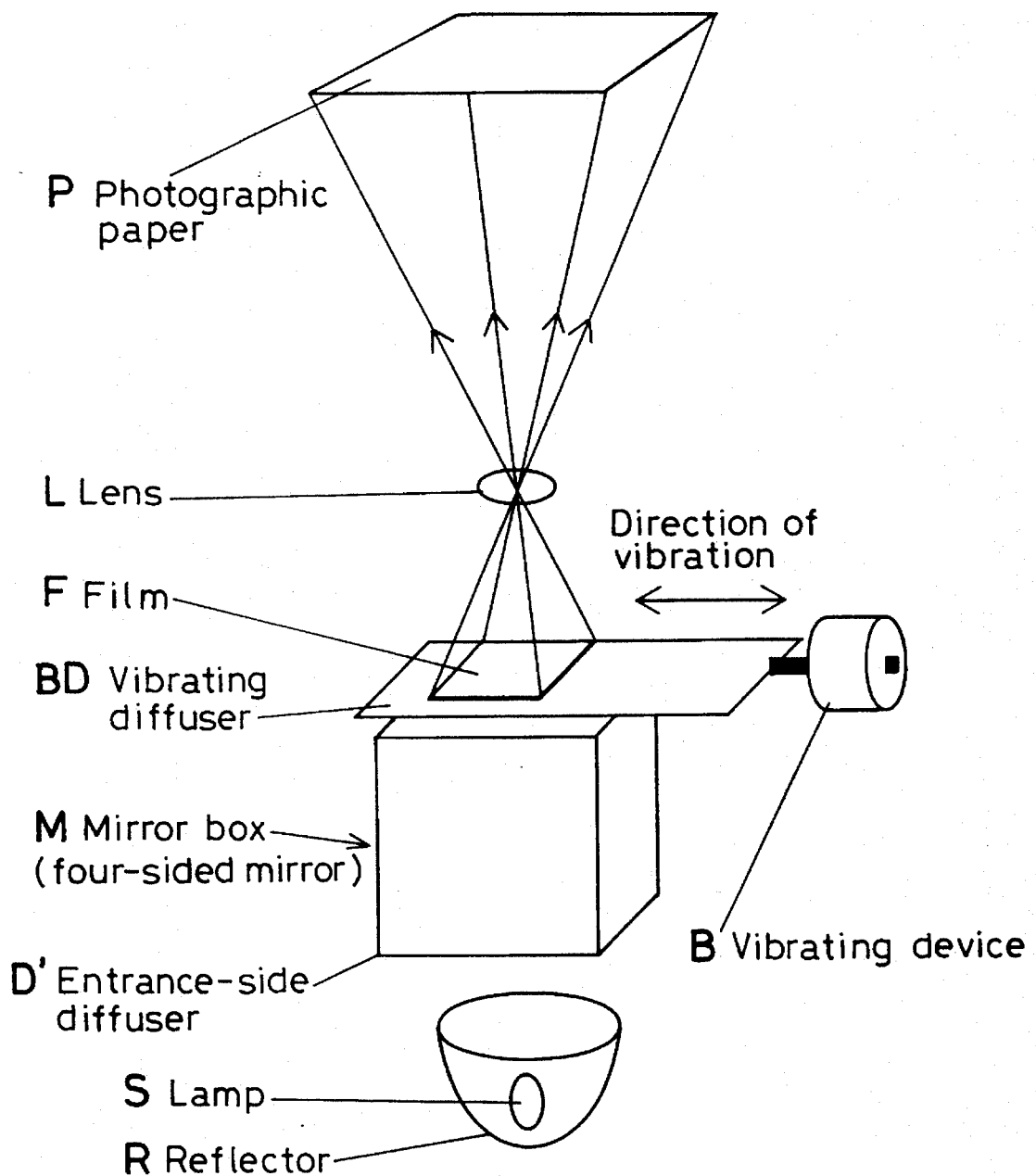
FIG. 1 is a perspective view schematically showing a photographic printer having a light source according to a first embodiment of the present invention.

FIG. 1 is a perspective view schematically showing a printer having a light source according to a first embodiment of the present invention. The printer has the following constituent elements in order from the light source side: a reflector R; a lamp S; a mirror box M; a vibrating diffuser BD; a film F; a printing lens L; and photographic paper P. The reflector R converges divergent light from the lamp S. The mirror box M scatters light from the lamp S. In this case, the mirror box M is a square cylinder having four internal mirrors, and has an entrance-side diffuser D' at the entrance thereof. The vibrating diffuser BD is disposed in close proximity to the exit of the mirror box M so as to intersect perpendicularly to the optical axis. The vibrating diffuser BD is caused to perform reciprocative vibration in parallel to its own plane by a vibrating device B, e.g., a voice coil. The film F which is to be printed off is disposed in close proximity to the vibrating diffuser BD. The printing lens L projects the image of the film F. The photographic paper P is disposed on a plane where the film image is formed by the printing lens L.

Figure 5:
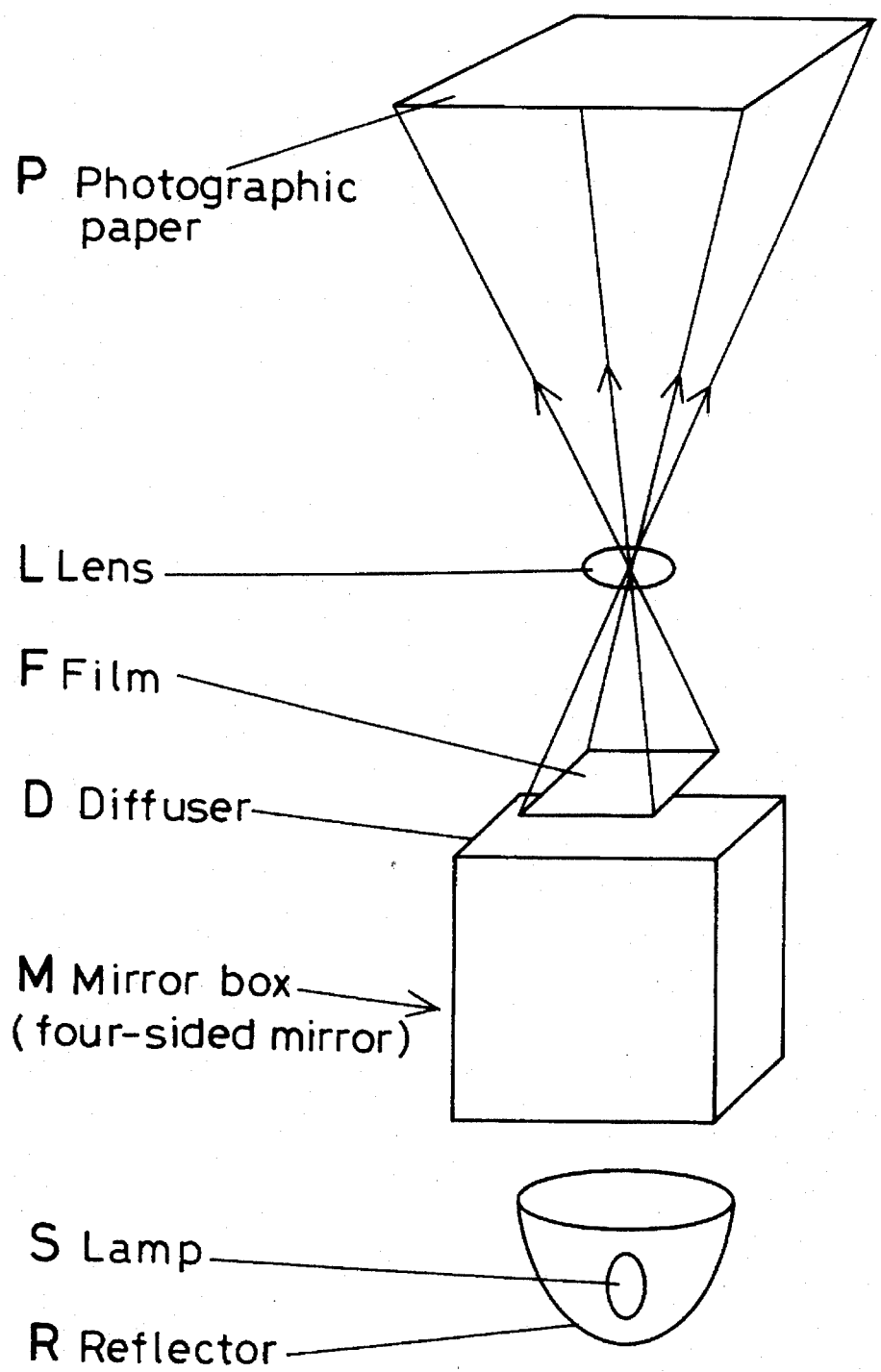
FIG. 5 is a perspective view schematically showing a photographic printer having a conventional light source.

In the printer having the above-described arrangement, the vibrating diffuser BD is used as a direct light source that illuminates the film F to be printed off, in the same way as in the case of the prior art shown in FIG. 5. The actual light source is the lamp S. Light from the lamp S is diffused by the diffusing box M and the vibrating diffuser BD, thereby producing diffused light that is required as a printer light source. Thus, blemishes and dust which may be present on the image recorded on the film F are made inconspicuous, and unevenness of printing is eliminated.

In the present invention, the diffuser BD, which is disposed near the film F, is caused to vibrate in a direction parallel to its own plane during the time of exposure, so that, even if an image of dust or a blemish on the diffuser BD is formed on the print, the image becomes blurred on the photographic paper P because it moves during the exposure process, thereby preventing the print from being affected by the image of such an undesired object. That is, the present invention provides the same effect as that in the case of the prior art shown in FIG. 5, in which the film F and the stationary diffuser D are spaced a certain distance apart from each other to make the image of dust or blemish on the diffuser D so unsharp as to be hidden. Thus, the film F and the diffuser BD can be placed closer to each other than in the case of the conventional printer light sources. Consequently, the quantity of light that can be utilized for printing can be increased to a considerable extent.

In the embodiment shown in FIG. 1, a voice coil is used as a device B for moving the vibrating diffuser BD in parallel to its own plane, and a sinusoidal current is supplied to the voice coil, thereby allowing the diffuser BD to vibrate sinusoidally. It is possible to use various other vibrating devices, as described later. The distance between the diffuser BD and the film F can be made shorter than in the case of the conventional light sources. Theoretically, the vibrating diffuser BD can be brought close to the film F as much as is desired as long as it does not contact the film F. However, rails or guides (not shown) are required to retain the diffuser BD, and it is therefore preferable to dispose the constituent elements so that scratches which may be made on the diffuser BD by contact with the rails or guides will not lie within the image area of the film F, and it is also preferable to use a glass material which is not readily scratched as a material for the diffuser BD.

Other devices which are usable for vibrating the diffuser BD during the exposure process will be explained below.

Figure 2:
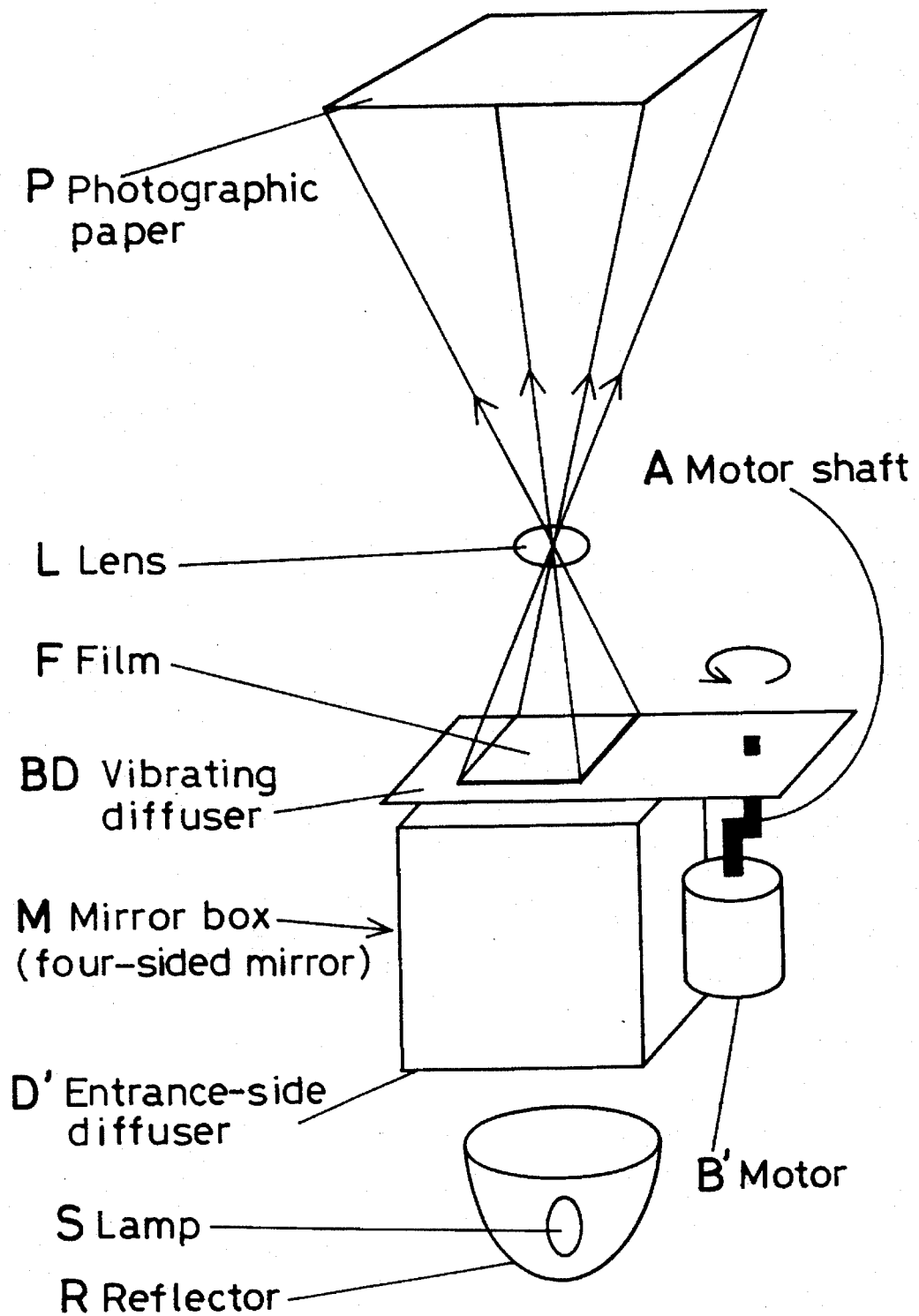
FIG. 2 is a perspective view schematically showing a photographic printer having a light source according to a second embodiment of the present invention.

FIG. 2 shows a second embodiment of the present invention, in which a rotating device B', e.g. a motor, is used as a device for vibrating the diffuser BD. The rotating device B' has a crank-shaped rotating shaft A. The distal end of the rotating shaft A is rotatably attached to the diffuser BD, thereby converting rotation into reciprocative vibration.

Figure 3:
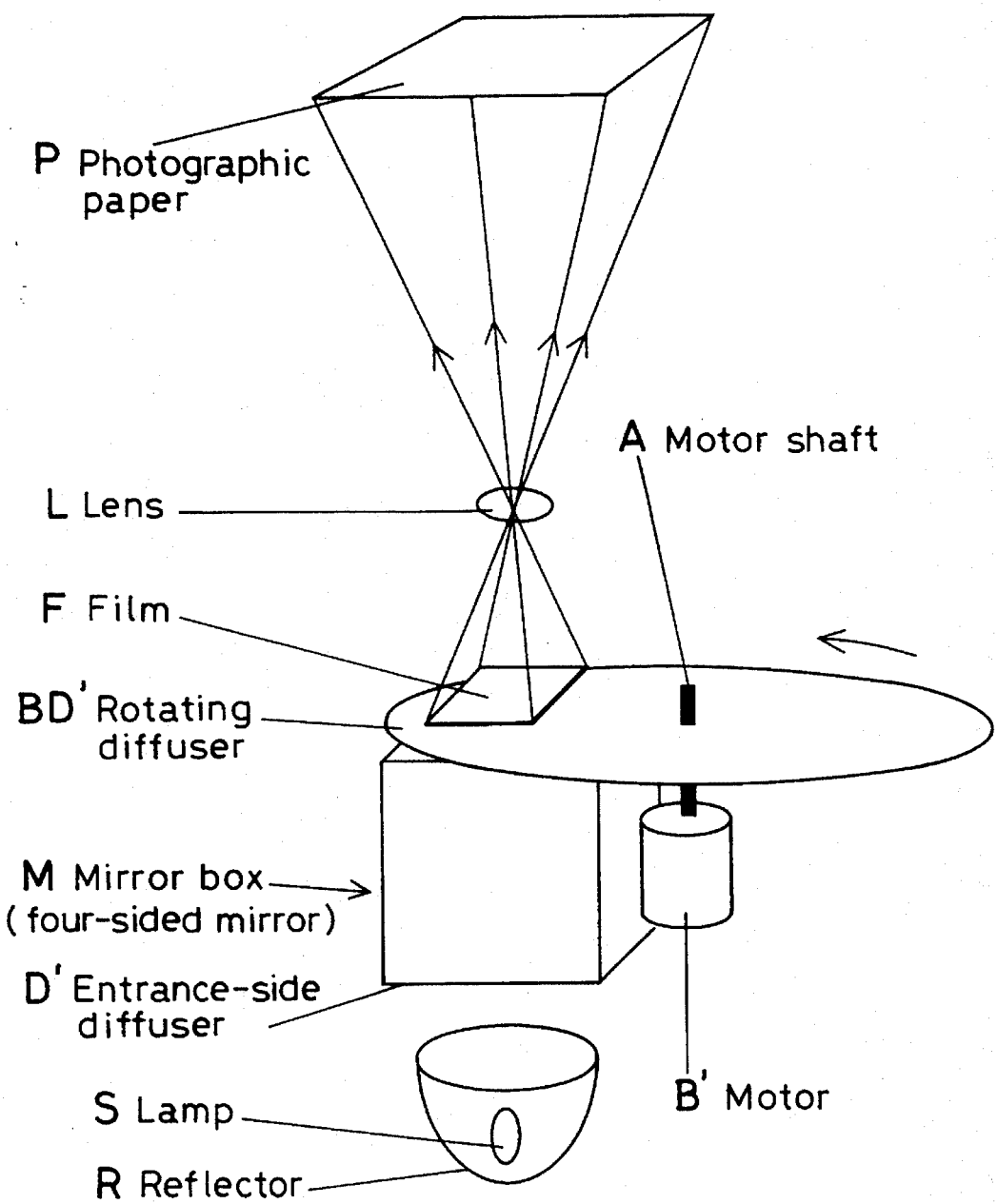
FIG. 3 is a perspective view schematically showing a photographic printer having a light source according to a third embodiment of the present invention.

FIG. 3 shows a third embodiment of the present invention, in which a rotating diffuser BD' is used in place of the vibrating diffuser BD, and a rotating shaft A of a rotating device B', e.g., a motor, is attached directly to the rotating diffuser BD'.

It is also possible to vibrate the diffuser BD with a small amplitude in a direction perpendicular to the plane of the diffuser BD (i.e., in the direction of the optical axis) with the distance to the film F maintained at a small value. With this arrangement also, the desired effect can be obtained.

Figure 4A:
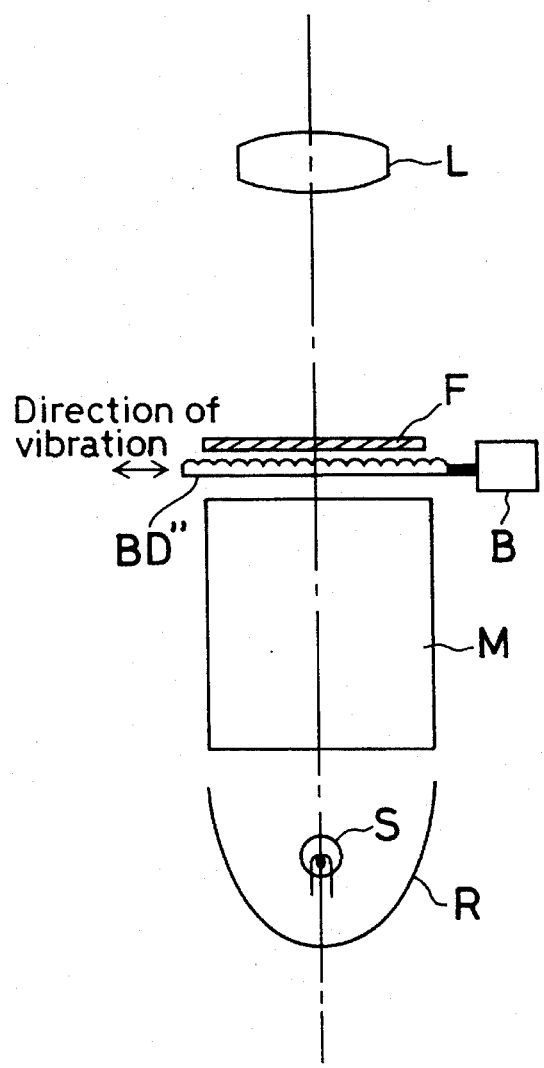
FIGS. 4(a) and 4(b) are fragmentary sectional views for explanation of the arrangement of a fourth embodiment of the present invention.
Figure 4B:
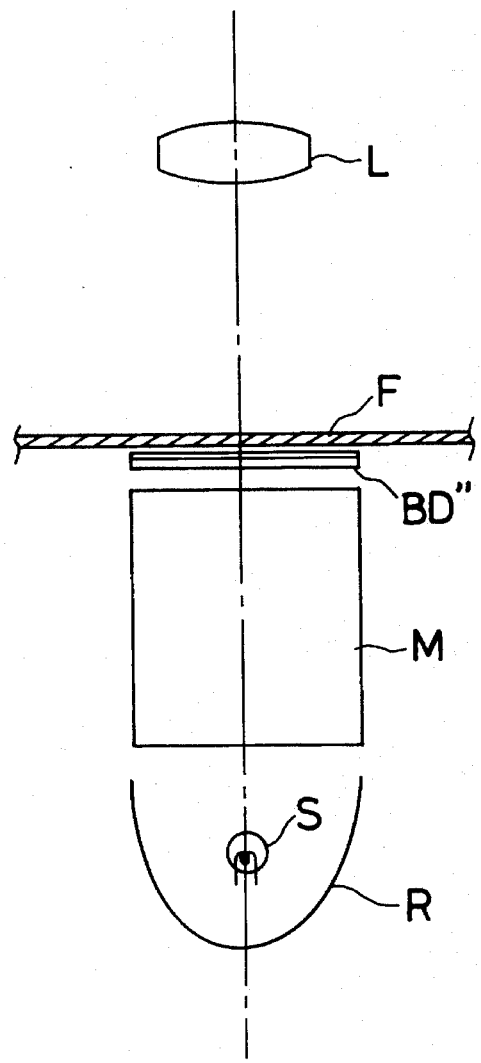

FIGS. 4(a) and 4(b) show a fourth embodiment of the present invention. FIG. 4(a) is a sectional view taken along a plane perpendicular to the longitudinal direction of the film F. FIG. 4(b) is a sectional view taken along a plane parallel to the longitudinal direction of the film F. In the fourth embodiment, an anisotropic diffuser BD" such as a lenticular lens disclosed in Japanese Patent Application Laid-Open (KOKAI) No. 01-298337 is used as a vibrating diffuser. The diffuser BD" is disposed so that the diffusion direction thereof is perpendicular to the longitudinal direction of the film F, and the diffuser BD" is vibrated in the same direction as the diffusion direction (i.e., in the direction perpendicular to the longitudinal direction of the film F), thereby making it possible to attain an improvement in the light source efficiency, which is an object of the present invention, and also enabling printing that is independent of blemishes made on the film F during transfer.

Although the printer light source of the present invention has been described above by way of some embodiments, it should be noted that the present invention is not necessarily limited to the described embodiments, and that various changes and modifications may be imparted thereto.

As will be clear from the foregoing description, the printer light source of the present invention has a diffuser which is disposed in an illuminating optical path in the vicinity of the film, and which is arranged to move during the time of exposure carried out to print the film image onto the photographic paper. Accordingly, as the diffuser is brought closer to the film, it can be consequently brought closer to the printing lens. Thus, it is possible to increase the quantity of light that can be utilized for printing.

Further, since the diffusing surface of the diffuser can be reduced in size, the diffusing box (mirror box) can be drawn into a tapered shape. Thus, it is also possible to increase the quantity of light that can be utilized for printing.

Further, it is possible not only to prevent the image of dust or a blemish on the diffuser from being recorded on the print but also to level the unevenness of thickness of the diffuser and also the unevenness of diffusion characteristics of the diffuser so that these unevennesses become inconspicuous.

In addition, dust can be effectively shaken from the diffuser by its movement, that is, rotation or vibration. Accordingly, dust which is so large as to form a shadow that cannot satisfactorily be erased simply by moving the diffuser can be advantageously shaken off by the movement of the diffuser. Therefore, there is no need of periodically cleaning the diffuser. Thus, the light source of the present invention is considerably easy to handle.

What we claim is:

1. A photographic printer comprising:

a lamp which produces light;

a mirror box which scatters the light from said lamp;

a diffuser which is movably disposed in proximity to an exit of said mirror box in an illuminating optical path of the light which has been scattered by said mirror box, said diffuser producing a diffused light;

a film which is to be printed off is disposed in proximity to said diffuser, the diffused light from said diffuser passing through said film;

a printing lens which projects an image of said film; and a photographic paper which is disposed on a plane where the image of said film is projected by said printing lens in order to print the projected image on said photographic paper, wherein said diffuser is arranged to move during a time of exposure carried out to print the image of said film onto said photographic paper, thereby to prevent the printed image from being affected by dust or blemishes on said diffuser.

2. The photographic printer according to claim 1, wherein said diffuser rotates in a plane which is parallel to a plane thereof.

3. The photographic printer according to claim 1, wherein said diffuser moves in a direction which is parallel to a plane thereof.

4. The photographic printer according to claim 3, wherein said diffuser is an anisotropic diffuser which is disposed so that a diffusion direction thereof is perpendicular to a longitudinal direction of said film, and which moves in the same direction as the diffusion direction.

5. The photographic printer according to claim 1, wherein said diffuser moves in a direction which intersects a plane thereof.

\* \* \* \* \*